(12) United States Patent
Nicholson et al.

(10) Patent No.: US 11,822,667 B2
(45) Date of Patent: Nov. 21, 2023

(54) SYSTEMS, APPARATUS, AND METHODS FOR EMBEDDED OPT-IN PERMISSION FOR AN ARTIFICAL INTELLIGENCE SERVICE

(71) Applicant: Lenovo (Singapore) PTE. LTD., New Tech Park (SG)

(72) Inventors: John W. Nicholson, Cary, NC (US); Daryl C. Cromer, Raleigh, NC (US); Howard Locker, Cary, NC (US); Mengnan Wang, Chapel Hill, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/356,301

(22) Filed: Jun. 23, 2021

(65) Prior Publication Data
US 2022/0414225 A1 Dec. 29, 2022

(51) Int. Cl.
*G06F 21/57* (2013.01)
*G06F 21/62* (2013.01)
*G06F 21/31* (2013.01)

(52) U.S. Cl.
CPC ............ *G06F 21/575* (2013.01); *G06F 21/31* (2013.01); *G06F 21/6281* (2013.01); *G06F 2221/2141* (2013.01)

(58) Field of Classification Search
CPC .... G06F 21/575; G06F 21/31; G06F 21/6281; G06F 2221/2141; G06F 21/57; G06F 21/62
See application file for complete search history.

(56) References Cited

U.S. PATENT DOCUMENTS

| | | | |
|---|---|---|---|
| 2017/0364637 A1* | 12/2017 | Kshepakaran | G16H 10/60 |
| 2019/0220662 A1* | 7/2019 | Shenouda Dawoud | G06F 3/011 |
| 2021/0366586 A1* | 11/2021 | Ryan | G06Q 20/389 |
| 2022/0335503 A1* | 10/2022 | DeVet | G06Q 30/0641 |

* cited by examiner

*Primary Examiner* — Quazi Farooqui
(74) *Attorney, Agent, or Firm* — Kunzler Bean & Adamson

(57) ABSTRACT

Methods that can embed opt-in permission for an artificial intelligence (AI) service are provided. One method includes implementing, by a processor, an access level of a plurality of access levels for user sensor data. The method further includes, based on the implemented access level, generating, from a set of raw sensor data received from a set of sensors, a set of sensor data for a user of an apparatus and gaining insight about the user of the apparatus via an AI service utilizing the set of sensor data. Here, implementing the access level provides to the user of the apparatus an embedded opt-in permission for the AI service. Systems and apparatus that can include, perform, and/or implement the methods are also provided.

20 Claims, 11 Drawing Sheets

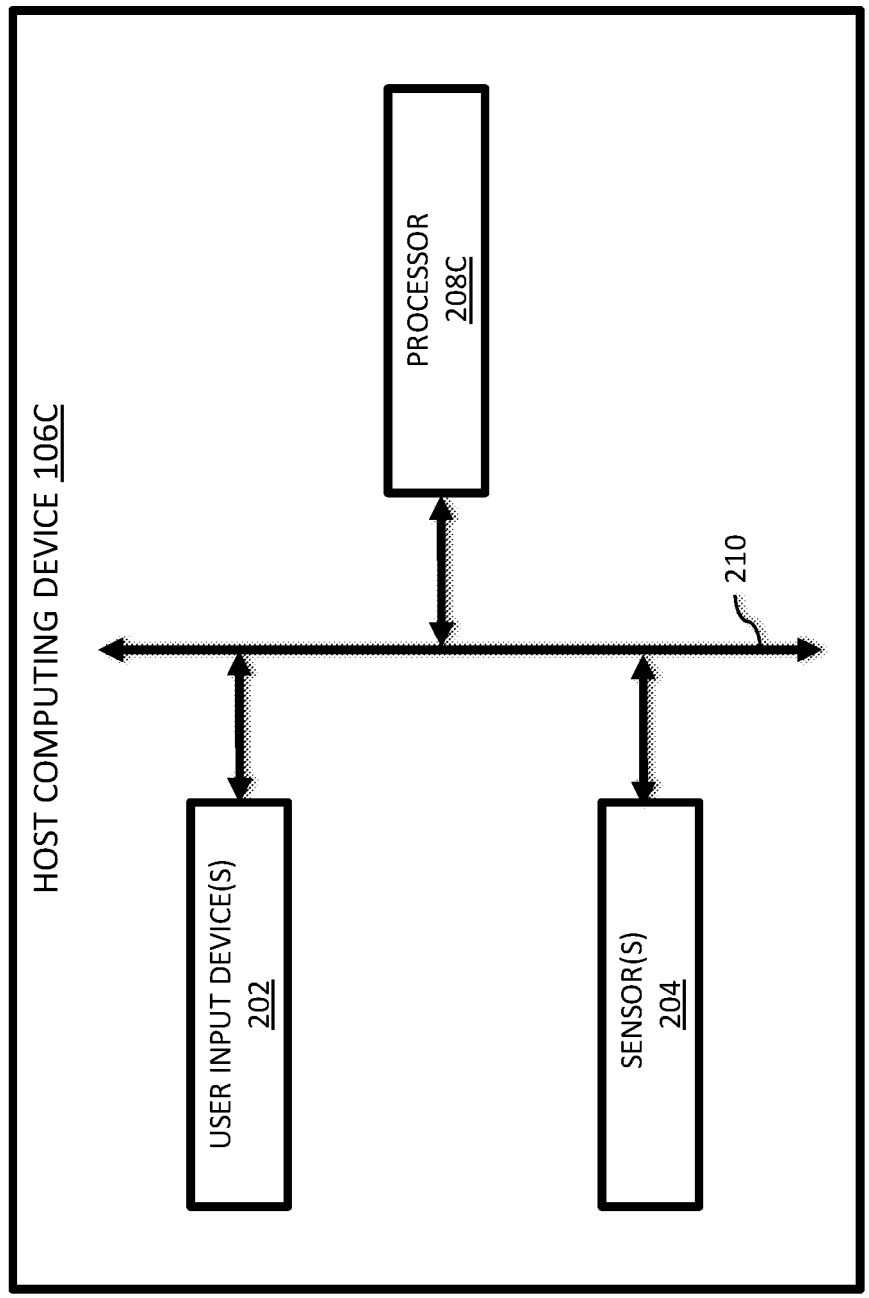

GENERATE A SUBSET OF RAW USER SENSOR DATA — 704B

FIG. 8

GENERATE A SUBSET OF USER SENSOR DATA — 710B

FIG. 9

PERFORM A SUBSET OF AI SERVICES FOR A USER — 714B

FIG. 10

SYSTEMS, APPARATUS, AND METHODS FOR EMBEDDED OPT-IN PERMISSION FOR AN ARTIFICAL INTELLIGENCE SERVICE

FIELD

The subject matter disclosed herein relates to computing networks, systems, and apparatus and, more particularly, relates to, systems, apparatus, and methods for embedded opt-in permission for an artificial intelligence service.

BACKGROUND

The most common practice for collecting user information is to ask the user to fill out a form providing the desired user information. Since the user provides the user information, the user decides what user information to provide (e.g., name, address, phone number, email address, birthday, gender, etc.). Here, the user has clear knowledge and consent of the user information that is to be collected. Also, the user has the inherent option of providing false user information if the user desires such. This situation does not scale to the world(s) of artificial intelligence (AI) and/or computer vision (CV).

In the AI and/or CV world(s), systems and apparatus can gather sensor data without the user's knowledge and/or consent. For example, image processing in at least some computing systems and/or apparatus is/are capable of directly determining the user's age, gender, race, etc. Further, the same systems/apparatus can also determine and/or infer the user's name, address, phone number, email address, birthday, etc. using cloud computing techniques and information. In the future, systems and/or apparatus will be able to observe the user's health information (e.g., blood pressure, body temperature, heart rate, etc.) and determine the user's state of health based on the observed health information. All of this information and data could be collected without the user's knowledge and/or consent.

If consent does exist, such consent could often be buried in an End User License Agreement (EULA) that most users would never really read and/or understand. Thus, users of an AI service should be able to know and consent to what user information is being collected and used by an AI service.

BRIEF SUMMARY

Methods, systems, apparatus, and methods that can embed an opt-in permission for an artificial intelligence (AI) service are provided. One method includes implementing, by a processor, an access level of a plurality of access levels for user sensor data. The method further includes, based on the implemented access level, generating, from a set of raw sensor data received from a set of sensors, a set of sensor data for a user of an apparatus and gaining insight about the user of the apparatus via an AI service utilizing the set of sensor data. Here, implementing the access level provides to the user of the apparatus an embedded opt-in permission for the AI service.

An apparatus includes a processor and a memory configured to store embedded code executable by the processor. The executable embedded code causes the processor to implement an access level of a plurality of access levels for user sensor data and, based on the implemented access level, perform a set of operations to: generate, from a set of raw sensor data received from a set of sensors, a set of sensor data for a user of the apparatus corresponding to the implemented access level and gain insight about the user of the apparatus via an AI service utilizing the set of sensor data corresponding to the implemented access level. Here, implementing the access level provides to the user of the apparatus an embedded opt-in permission for the AI service.

A computer program product comprising a computer-readable storage medium configured to store embedded code executable by a processor is also provided. The executable embedded code comprises code to perform implementing an access level of a plurality of access levels for user sensor data and, based on the implemented access level, perform a set of operations to generate, from a set of raw sensor data received from a set of sensors, a set of sensor data for a user of the apparatus corresponding to the implemented access level and gain insight about the user of the apparatus via an AI service utilizing the set of sensor data corresponding to the implemented access level. Here, implementing the access level provides to the user of the apparatus an embedded opt-in permission for the AI service.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which:

FIG. 2C is a block diagram of yet another embodiment of a host computing device included in the systems of FIGS. 1A and 1B

FIG. 8 is a schematic diagram illustrating another embodiment of operations for generating a set of user raw sensor data included in the method of FIG. 7;

FIG. 9 is a schematic diagram illustrating another embodiment of operations for generating a set of user sensor data included in the method of FIG. 7; and FIG. 10 is a schematic diagram illustrating another embodiment of operations for performing a set of AI services for a user included in the method of FIG. 7.

DETAILED DESCRIPTION

Figure 1A:
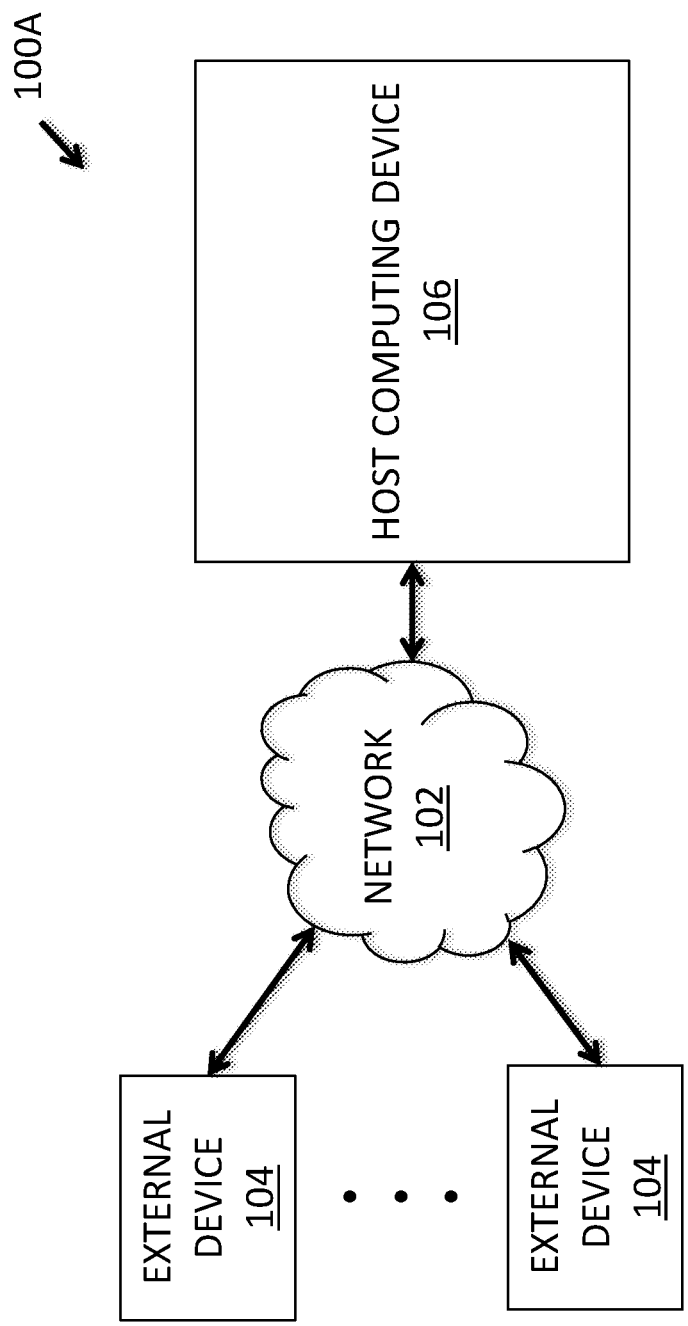
FIG. 1A is a block diagram of one embodiment of a system for embedding an opt-in permission for an artificial intelligence (AI) service.

Disclosed herein are various embodiments providing methods, systems, and computer program products that can embed an opt-in permission for an artificial intelligence (AI) service. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of, "one or mores," "ones or more," and/or "ones or mores," consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon and/or similar device(s), and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together and may include disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

With reference now to the drawings, FIG. 1A is a block diagram of one embodiment of a computing system 100A including a network 102 connecting a set of external devices 104 (also simply referred individually, in various groups, or collectively as external device(s) 104) and a host computing system and/or host computing device 106 (also simply referred to as host 106). The network 102 may include any suitable wired and/or wireless network 102 (e.g., public and/or private computer networks in any number and/or configuration (e.g., the Internet, an intranet, a cloud network, etc.)) that is known or developed in the future that enables the set of external devices 104 and the host 106 to be coupled to and/or in communication with one another and/or to share resources. In various embodiments, the network 102 can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources that are possible and contemplated herein.

An external device 104 may include any suitable computing device and/or computing system capable of accessing and/or sharing resources with the host 106 via the network 102. In various embodiments, one or more of the external devices 104 can provide a cloud-based service and/or a service that is external to the host 106A (e.g., an external service). An external device 104 can also include any suitable computing hardware and/or software (e.g., a thick client, a thin client, a server, a server farm, a data center, one or more clusters, etc., or hybrid(s) thereof) capable of accessing and/or sharing resources with the host 106 via the network 102.

Each external device 104, as part of its respective operation, relies on sending 110 requests to the host 106 to write data, read data, and/or modify data. Specifically, each external device 104 can transmit I/O requests to read, write, store, communicate, propagate, and/or transport instructions, data, computer programs, software, code, routines, etc., to the host 106 and may comprise at least a portion of a client-server model. In general, the host 106 can be accessed by the external device(s) 104 and/or communication with the host 106 can be initiated by the external device(s) 104 through a network socket (not shown) utilizing ogre or more inter-process networking techniques.

A host computing device 106 (or host device 106 or host 106) may include any suitable computer hardware and/or software that can provide host operations. In various embodiments, a host computing device 106 can include one or more processors, computer-readable memory, and/or one or more interfaces, among other features and/or hardware. A host computing device 106 can further include any suitable software component or module, or computing device(s) that is/are capable of hosting and/or serving a software application or services, including distributed, enterprise, and/or cloud-based software applications, data, and services. For instance, a host computing device 106 can be configured to host, serve, or otherwise manage data sets, or applications interfacing, coordinating with, or dependent on or used by other services, including transportation service applications and software tools. In some instances, a host 106 can be implemented as some combination of devices that can comprise a common computing system and/or device, server, server pool, or cloud computing environment and share computing resources, including shared memory, processors, and interfaces.

Figure 1B:
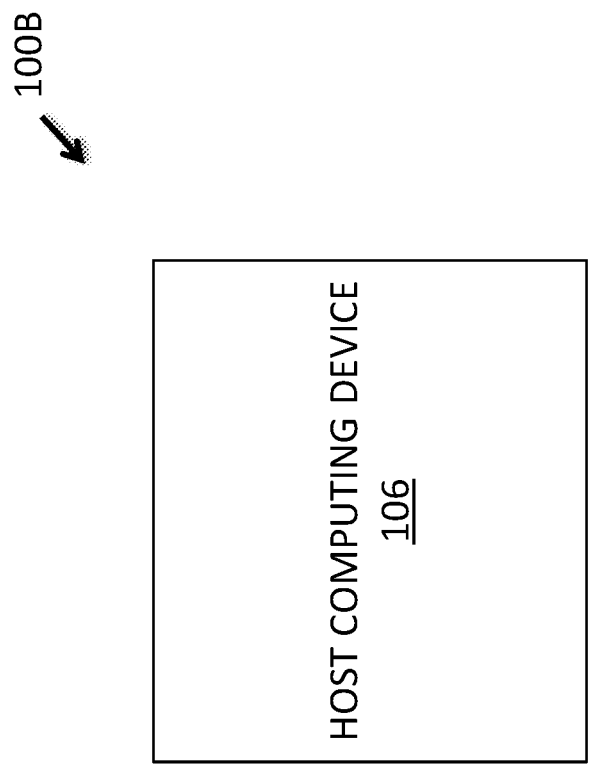
FIG. 1B is a block diagram of one embodiment of a stand-alone system for embedding an opt-in permission for an AI service.

In some embodiments, the host computing device 106 is a stand-alone device (see, e.g., system 100B in FIG. 1B). In system 100B, which can be a stand-alone system, the data and/or result generated by the host computing device 106 is/are not transmitted to and/or shared with an external device 104.

Figure 2A:
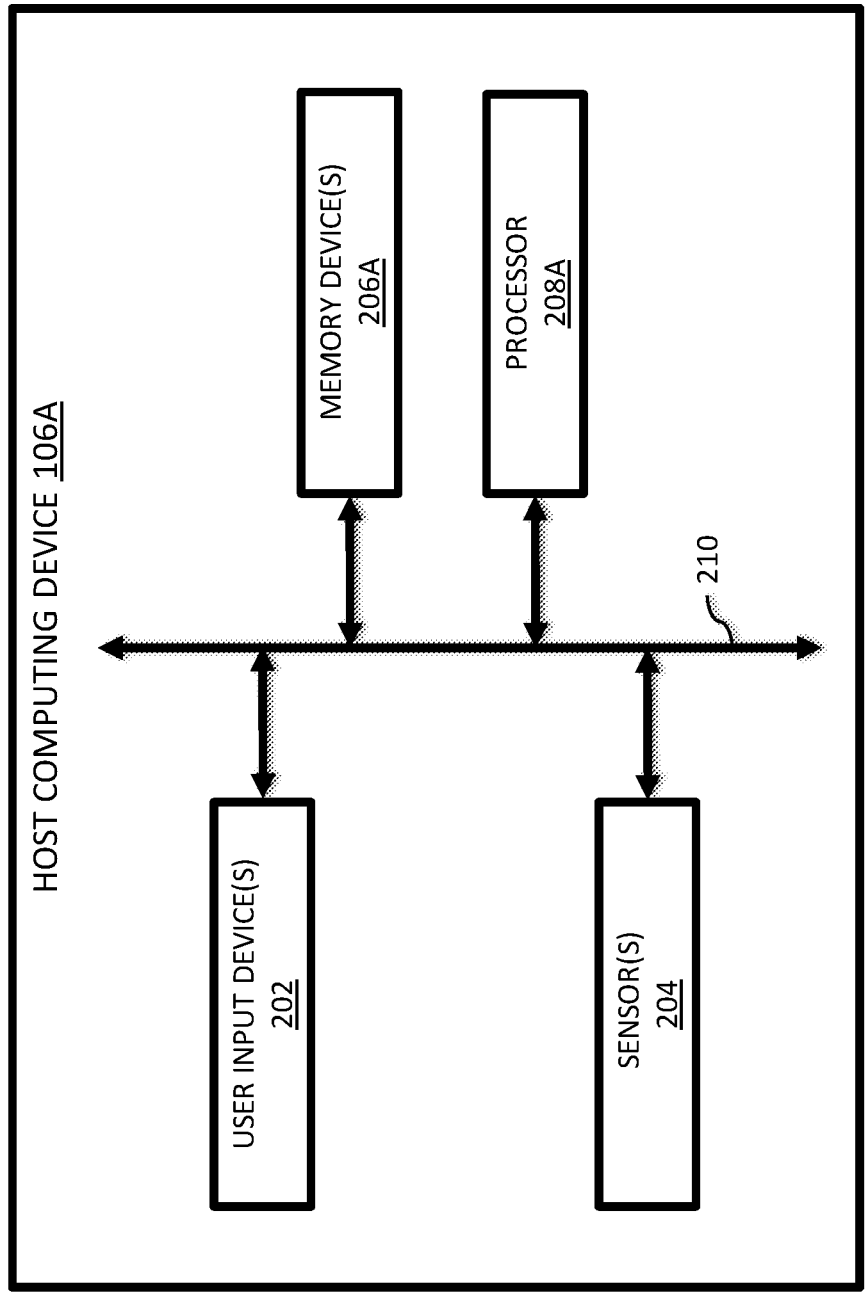
FIG. 2A is a block diagram of one embodiment of a host computing device included in the systems of FIGS. 1A and 1B.

With reference to FIG. 2A, FIG. 2A is a block diagram of one embodiment of a host computing device 106A. A host computing device 106A may include and/or form a computing device/system (e.g., a laptop computer, a personal digital assistant (PDA), a tablet computer, a smart phone, a cellular telephone, a smart television, a wearable device, an Internet of Things (IoT) device, a game console, a vehicle on-board computer, a streaming device, a smart device, and a digital assistant, etc., among other computing devices and/or information handling devices that are possible and contemplated herein). At least in the illustrated embodiment, the host computing device 106A includes, among other components, a set of one or more user input devices 202, a set of one or more sensor devices 204, a set of one or more memory devices 206A, and a processor 208A coupled to and in communication with one another via a bus 210 (e.g., a wired and/or wireless bus).

A set of input devices 202 may include any suitable quantity of input devices 202. In some embodiments, the set of input devices 202 includes one (1) input device 202. In further embodiments, the set of input devices 202 includes two (2) or more input devices 202.

The set of input devices 202 may include any suitable input device(s) 202 that is/are known or developed in the future that can receive a set of inputs (e.g., one or more inputs) from a user. Example input devices 202 include, but are not limited to, a keyboard, a mouse, a touchscreen, a stylus, a trackball, a touchpad, a pointing stick, a knob, a remote, a paddle, a webcam, a microphone, an image scanner, a fingerprint scanner, a barcode reader, a digital pen, a camera, a joystick, etc., among other types of input devices that are possible and contemplated herein.

A set of sensor devices 204 may include any suitable quantity of sensor devices 204. In some embodiments, the set of sensor devices 204 includes one sensor device 204. In further embodiments, the set of sensor devices 204 includes two or more sensor devices 204.

The set of sensor devices 204 may include any suitable sensor device(s) 204 that is/are known or developed in the future that can detect, sense, and/or measure physical inputs as raw sensor data indicative of a set of biometric properties and/or conditions of a user. That is, the sensor device(s) 204 can include any suitable device that can read and/or measure light, temperature, speed, and/or electrical capacity, etc. as raw sensor data, among other types of inputs that can be utilized as raw sensor data to indicate and/or represent a set of biometric properties and/or conditions of a user that are possible and contemplated herein. Example sensor devices 204 include, but are not limited to, an image sensor (e.g., a camera, a video recorder, a webcam, a thermal imager, a facial recognition device, a CMOS image sensor, an X-ray scanner, a magnetic resonance imaging (MM) scanner, etc.), a temperature sensor (e.g., a thermometer etc.), a fingerprint reader, an eye scanner, a microphone, an ultrasound sensor, etc., among other types of sensor devices and/or biometric sensors that are possible and contemplated herein.

In some embodiments, each sensor device 204 is configured to generate a raw sensor signal including raw sensor data indicating and/or representing a physical input corresponding to its particular type of sensor device 204. In various embodiments, the raw sensor signal(s) including the raw sensor data are generated by the sensor device(s) 204 in real-time as the sensor device(s) 204 are detecting, sensing, and/or measuring the physical input(s) indicative of the set of biometric properties and/or conditions of the user. In additional embodiments, each sensor device 204 is configured to transmit the generated raw sensor signal(s) including the raw sensor data to a set of one or more memory devices (e.g., memory device(s) 206A and memory device(s) 206B) and/or a processor (e.g., processor 208B and processor 208C), as discussed elsewhere herein.

A set of memory devices 206A may include any suitable quantity of memory devices 206A. In some embodiments, the set of memory devices 20206A includes one memory device 206A. In further embodiments, the set of memory devices 206A includes two or more memory devices 206A.

Each memory device 206A may include any suitable type of device and/or system that is known or developed in the future that can store computer-useable data. In various embodiments, a memory device 206A may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

A memory device 206A, in some embodiments, includes volatile computer storage media. For example, a memory device 206A may include random access memory (RAM), including dynamic RAM (DRAM), synchronous dynamic RAM (SDRAM), and/or static RAM (SRAM). In other embodiments, a memory device 206A includes non-volatile computer storage media. For example, a memory device 206A may include a hard disk drive, a flash memory, and/or any other suitable non-volatile computer storage device that is known or developed in the future. In various embodiments, a memory device 206A includes both volatile and non-volatile computer storage media. In additional embodiments, a memory device 206A also stores program code and/or related data, such as an operating system (OS) and/or other controller algorithms operating on a host computing device 106.

Figure 3:
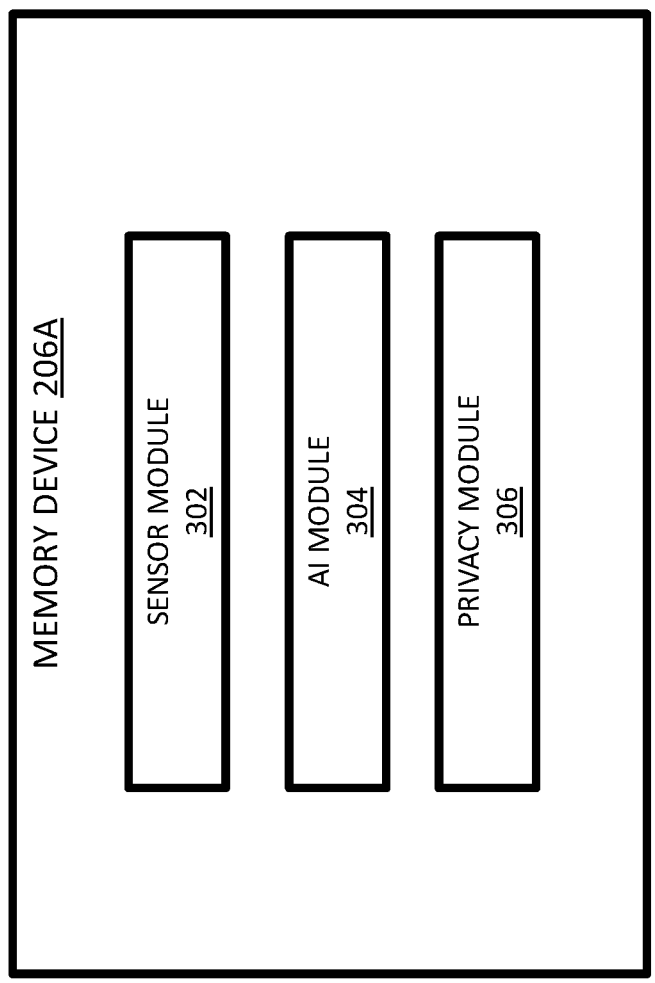
FIG. 3 is a block diagram of one embodiment of a memory device included in the host computing device of FIG. 2A.

Referring to FIG. 3, FIG. 3 is a block diagram of one embodiment of a memory device 206A. At least in the illustrated embodiment, the memory device 206A includes, among other components, a sensor module 302, an artificial intelligence (AI) module 304, and a privacy module 306.

In at least some embodiments, the sensor module 302, the AI module 304, and/or the privacy module 306 include computer-executable code and/or computer-useable code that is embedded in the memory device(s) 206A. That is, the sensor module 302, the AI module 304, and/or the privacy module 306 is/are embedded in the memory device(s) 206A.

In various embodiments, the embedded code including the sensor module 302, the AI module 304, and/or the privacy module 306 is included in a pre-boot code, an operating system code, a system management basic input/output system (SMBIOS) code, a device driver code, and/or an application code. That is, the sensor module 302, the AI module 304, and/or the privacy module 306 may be embedded code forming at least a portion of a pre-boot code, an operating system code, a SMBIOS code, a device driver code, and/or an application code.

A sensor module 302 may include any suitable hardware and/or software that can receive one or more raw sensor signals from the sensor device(s) 204 and convert the raw sensor signal(s) to one or more corresponding sensor signals. The raw sensor signal(s) may include any suitable raw sensor signal that is known or developed in the future and/or the sensor signal(s) may include any suitable sensor signal that is known or developed in the future.

In various embodiments, the sensor module 302 is configured to convert the input(s) in the received raw sensor signal(s) detected by the corresponding sensor device 204 to one or more sensor signals including sensor data that indicate(s) and/or represent(s) one or more biometric properties and/or conditions of a user. In various embodiments, the biometric properties/conditions in the sensor data can include, but are not limited to, one or more personal traits (e.g., gender, age, race, nationality, age-decade, eye color, hair color, skin color, voice, height, handicap(s), fingerprint, iris, retina, etc.), one or more biometric traits (e.g., body temperature, blood pressure, heartrate, hydration level, blood oxygen level, glucose level, muscle use, overall health, etc.) and/or contextual traits (e.g., mood, stress level, focus, attention, etc.), among other user biometric properties/conditions that are capable of being detected by a sensor device 204 that are possible and contemplated herein.

In various embodiments, the sensor data is generated by the sensor module 302 in real-time as the sensor module 302 receives that raw sensor signal(s) from the sensor device(s) 204. In additional or alternative embodiments, the sensor data is generated by the sensor module 302 not in real-time (e.g., at a time subsequent to the sensor module 302 receiving the raw sensor signal(s) from the sensor device(s) 204).

In certain embodiments, the generated sensor data is stored in a library (e.g., in memory device(s) 206) for future use and/or current use. In additional or alternative embodiments, the raw sensor data is stored in a library (e.g., in memory device(s) 206) for future use and/or current use, which can be the same library or a different library than the library storing the sensor data.

The sensor data can be utilized to gain insight about the user of the host computing device 106. As such, in various embodiments, the sensor module 302 is configured to transmit the sensor data generated by the sensor module 302 to the AI module 304.

An AI module 304 may include any suitable hardware and/or software that can receive the sensor data from the sensor module 302 and perform an AI service using the sensor data. The AI service may include any suitable AI service that is known or developed in the future. Example AI services can include, but are not limited to, physical health care services, mental health care services, personal care services, etc., among other AI services that are possible and contemplated herein.

The AI service, in various embodiments, enables and/or allows the host computing device 106 to gain one or more insights about the user corresponding to the AI service. For example, an AI service can obtain insight about the user's physical health, mental health, and/or personal care, each of which can be gained from the sensor data received from the sensor module 302.

In various embodiments, the insight(s) are calculated and/or gained by the AI module 304 in real-time as the AI module 304 receives the sensor data from the AI module 304. In certain embodiments, the insight(s) are calculated and/or gained by the AI module 304 not in real-time (e.g., at a time subsequent to the AI module 304 receiving the sensor data from the AI module 304).

In further embodiments, the insight(s) gained about the user are stored in a library (e.g., in memory device(s) 206) for future use and/or current use. The library can be the same library that stores the sensor data for the user and/or in a different library that can be dedicated for storing the insight(s) (e.g., in memory device(s) 206).

A privacy module 306 may include any suitable hardware and/or software that can implement an access level for obtaining the sensor data of a user of the host computing device 106 and/or gaining insight about the user via an AI service utilizing the obtained sensor data. In some embodiments, the user can set/implement the access level. In additional or alternative embodiments, a system administrator can set/implement the access level.

In various embodiments, the implemented access level is one of a plurality of access levels. Non-limiting examples of an access level can include, but are not limited to, a low privacy level (e.g., a no restriction access level, etc.), a medium privacy level (e.g., a local use only access level, a prompted access level, an application-specific access level, and a service-specific access level, etc.), and a high privacy level (e.g., a fully restricted access level, etc.), among other privacy levels and/or access levels that are possible and contemplated herein.

A no restriction access level, in some embodiments, can allow and/or enable the sensor device(s) 204 to detect and transmit any and/or all detected raw sensor data of the user to any requesting sensor module 302. In additional or alternative embodiments, a no restriction access level can allow and/or enable the sensor module 302 to calculate, generate, and transmit any and/or all sensor data to any requesting AI module 304. In further additional or alternative embodiments, a no restriction access level can allow and/or enable the AI module 304 to transmit any all insights gained about the user to any requesting external entity.

A fully restricted access level, in some embodiments, can disallow and/or prevent the sensor device(s) 204 from transmitting and/or using any raw sensor data outside of the particular host computing device 106. In additional or alternative embodiments, a fully restricted access level can disallow and/or prevent the sensor module 302 from transmitting any sensor data to an AI module 304 outside of the particular host computing device 106 and/or using any sensor data outside of the particular host computing device 106. In further additional or alternative embodiments, a fully restricted access level can disallow and/or prevent the AI module 304 from transmitting or using the insight(s) gained about a user outside of the particular host computing device 106.

A local use only access level, in some embodiments, can allow and/or enable the sensor device(s) 204 to detect and transmit any and/or all detected raw sensor data of the user to a local sensor module 302. In additional or alternative embodiments, a local use only access level can allow and/or enable only a local sensor module 302 to calculate and generate any and/or all sensor data and/or transmit the sensor data to only a local AI module 304. In further additional or alternative embodiments, a local use only access level can allow and/or enable only a local AI module 304 to perform any suitable AI service using the sensor data. Here, the term local means only located within the host device 106 and/or not located external to the host device 106.

A prompted access level, in some embodiments, can allow and/or enable the sensor device(s) 204 to detect and transmit any and/or all detected raw sensor data of the user to a requesting sensor module 302 via the corresponding raw sensor signal(s) in response to prompting the user for permission for each request and receiving such permission for each respective request from the user (e.g., via one or more user input device(s) 202). In additional or alternative embodiments, a prompted access level can allow and/or enable the sensor module 302 to calculate, generate, and transmit any and/or all sensor data to a requesting AI module 304 in response to prompting the user for permission for each respective request and receiving such permission for each respective AI module 304 from the user (e.g., via one or more user input device(s) 202). In further additional or alternative embodiments, a prompted access level can allow and/or enable the AI module 304 to perform any suitable AI service using the sensor signal(s) in response to prompting the user for permission and receiving such permission from the user (e.g., via one or more user input device(s) 202).

An application-specific access level, in some embodiments, can allow and/or enable the sensor device(s) 204 to detect and transmit any and/or all detected raw sensor data of the user to the sensor module 302 via the corresponding raw sensor signal(s) when operating in conjunction with a specific application designated/authorized by the user. In additional or alternative embodiments, an application-specific access level can allow and/or enable the sensor module 302 to calculate, generate, and transmit any and/or all sensor data to the AI module 304 for use by the AI module 304 when operating in conjunction with a specific application designated/authorized by the user. In further additional or alternative embodiments, an application-specific access level can allow and/or enable the AI module 304 to perform any suitable AI service using the sensor data when operating in conjunction with a specific application designated/authorized by the user.

A service-specific access level, in some embodiments, can allow and/or enable the sensor device(s) 204 to detect and transmit any and/or all detected raw sensor data of the user to the sensor module 302 via the corresponding raw sensor signal(s) when operating in conjunction with a specific service designated/authorized by the user. In additional or alternative embodiments, a service-specific access level can allow and/or enable the sensor module 302 to calculate, generate, and transmit any and/or all sensor data to the AI module 304 for use by the AI module 304 when operating in conjunction with a specific service designated/authorized by the user. In further additional or alternative embodiments, a service-specific access level can allow and/or enable the AI module 304 to perform any suitable AI service using the sensor data when operating in conjunction with a specific service designated/authorized by the user.

Further non-limiting examples of an access level can include, but are not limited to, an application-based access level, a quantity-based access level, a location-based access level, and a time-based access level. These further non-limiting examples can be implemented in addition to or in lieu of the non-limiting examples discussed above.

An application-based access level, in some embodiments, can allow and/or enable the sensor device(s) 204 to detect and transmit any and/or all detected raw sensor data of the user to the sensor module 302 via the corresponding raw sensor signal(s) when operating in conjunction with a particular type of application designated/authorized by the user. In additional or alternative embodiments, an application-based access level can allow and/or enable the sensor module 302 to calculate, generate, and transmit any and/or all sensor data to the AI module 304 for use by the AI module 304 when operating in conjunction with a particular type of application designated/authorized by the user. In further additional or alternative embodiments, an application-based access level can allow and/or enable the AI module 304 to perform any suitable AI service using the sensor data when operating in conjunction with a particular type of application designated/authorized by the user.

A quantity-based access level, in some embodiments, can allow and/or enable the sensor device(s) 204 to detect and transmit any and/or all detected raw sensor data of the user to the sensor module 302 via the corresponding raw sensor signal(s) when the quantity of times the operations are performed by the sensor device(s) 204 to generate the raw sensor data is less than or equal to a predetermined quantity of operations designated/authorized by the user. In additional or alternative embodiments, a quantity-based access level can allow and/or enable the sensor module 302 to calculate, generate, and transmit any and/or all sensor data to the AI module 304 when the quantity of times the operations to generate the sensor data using the raw sensor data are performed by the sensor module 302 is less than or equal to a predetermined quantity of operations designated/authorized by the user. In further additional or alternative embodiments, a quantity-based access level can allow and/or enable the AI module 304 to perform any suitable AI service using the sensor data when the quantity of times the operations are performed by the AI module 304 using the sensor data is less than or equal to a predetermined quantity of operations designated/authorized by the user.

A location-based access level, in some embodiments, can allow and/or enable the sensor device(s) 204 to detect and transmit any and/or all detected raw sensor data of the user to the sensor module 302 via the corresponding raw sensor signal(s) when the operations performed by the sensor device(s) 204 are performed at a specific location and/or within a predetermined distance of the specific location. In additional or alternative embodiments, a location-based access level can allow and/or enable the sensor module 302 to calculate, generate, and transmit any and/or all sensor data to the AI module 304 for use by the AI module 304 when the operations performed by the sensor module 302 are performed at a specific location and/or within a predetermined distance of the specific location. In further additional or alternative embodiments, a location-based access level can allow and/or enable the AI module 304 to perform any suitable AI service using the sensor data when the operations performed by the AI module 304 are performed at a specific location and/or within a predetermined distance of the specific location.

A time-based access level, in some embodiments, can allow and/or enable the sensor device(s) 204 to detect and transmit any and/or all detected raw sensor data of the user to the sensor module 302 via the corresponding raw sensor signal(s) when the operations performed by the sensor device(s) 204 are performed at a specific time, within a predetermined window/period of time, and/or within a specific amount of time. In additional or alternative embodiments, a time-based access level can allow and/or enable the sensor module 302 to calculate, generate, and transmit any and/or all sensor data to the AI module 304 for use by the AI module 304 when the operations performed by the sensor module 302 are performed at a specific time, within a predetermined window/period of time, and/or within a specific amount of time. In further additional or alternative embodiments, a time-based access level can allow and/or enable the AI module 304 to perform any suitable AI service using the sensor data when the operations performed by the AI module 304 are performed at a specific time, within a predetermined window/period of time, and/or within a specific amount of time.

In some embodiments, the privacy module 306 is further configured to provide a user with an AI collection indicator that indicates that raw sensor data for the user is being generated and/or sensor data for the user is being generated by the host computing device 106 (e.g., by the sensor device(s) 204 and/or the sensor module 302). In additional or alternative embodiments, the privacy module 306 is configured to provide the user with the AI collection indicator in response to the host computing device 106 gaining insight(s) about the user (e.g., by the AI module 304).

The AI collection indicator may include any suitable indicator and/or indication that is capable of notifying, alerting, and/or otherwise letting the user know that one or more of the user's biometric properties and/or states is/are being collected (e.g., via raw sensor data), sensor data is being generated based on the raw sensor data, and/or that the user's sensor data is being utilized to gain one or more insights about the user. Example indicators can include, but are not limited to, a visual indicator (e.g., an indicator light, display of an alphanumeric message, a change in color of a display, etc.), an audio indicator (e.g., a sound, a voice message, an audio message, a beep, a chime, a bell, etc.), and/or a tactile indicator (e.g., a vibration, etc.), among other indicators that can notify/alert a user using one or more user senses that are possible and contemplated herein In various embodiments, the sensor module 302, the AI module 304, and/or the privacy module 306 includes computer-executable code and/or computer-useable code embedded in the memory device(s) 206A. Further, the embedded code including the privacy module 306 can provide a user an embedded opt-in permission for the sensor device(s) 204, the raw sensor data, the sensor data, and/or the AI service. In various embodiments, the embedded code forms at least a portion of a pre-boot code, an operating system code, a SMBIOS code, a device driver code, and/or an application code embedded in the memory device(s) 206A.

With reference again to FIG. 2A, a processor 208A may include any suitable non-volatile/persistent hardware and/or software configured to perform and/or facilitate performing functions and/or operations for facilitating embedded opt-in permission for an artificial intelligence service on a host 106A. In various embodiments, the processor 208A includes hardware and/or software for executing instructions in one or more modules and/or applications that can perform and/or facilitate performing functions and/or operations for facilitating embedded opt-in permission for an artificial intelligence service on the host 106A. The modules and/or applications executed by the processor 208A for facilitating embedded opt-in permission for an artificial intelligence service on a host 106A can be stored on and executed from a memory device 206A.

In some embodiments, the processor 208A is configured to transmit the data and/or results from the AI service to one or more of the external devices 104 (e.g., one or more cloud-based services and/or one or more external services). In other embodiments, the processor 208A is configured to keep/maintain the data and/or results from the AI service on the host 106A and not transmit the data and/or results from the AI service to any of the external devices 104.

Figure 2B:
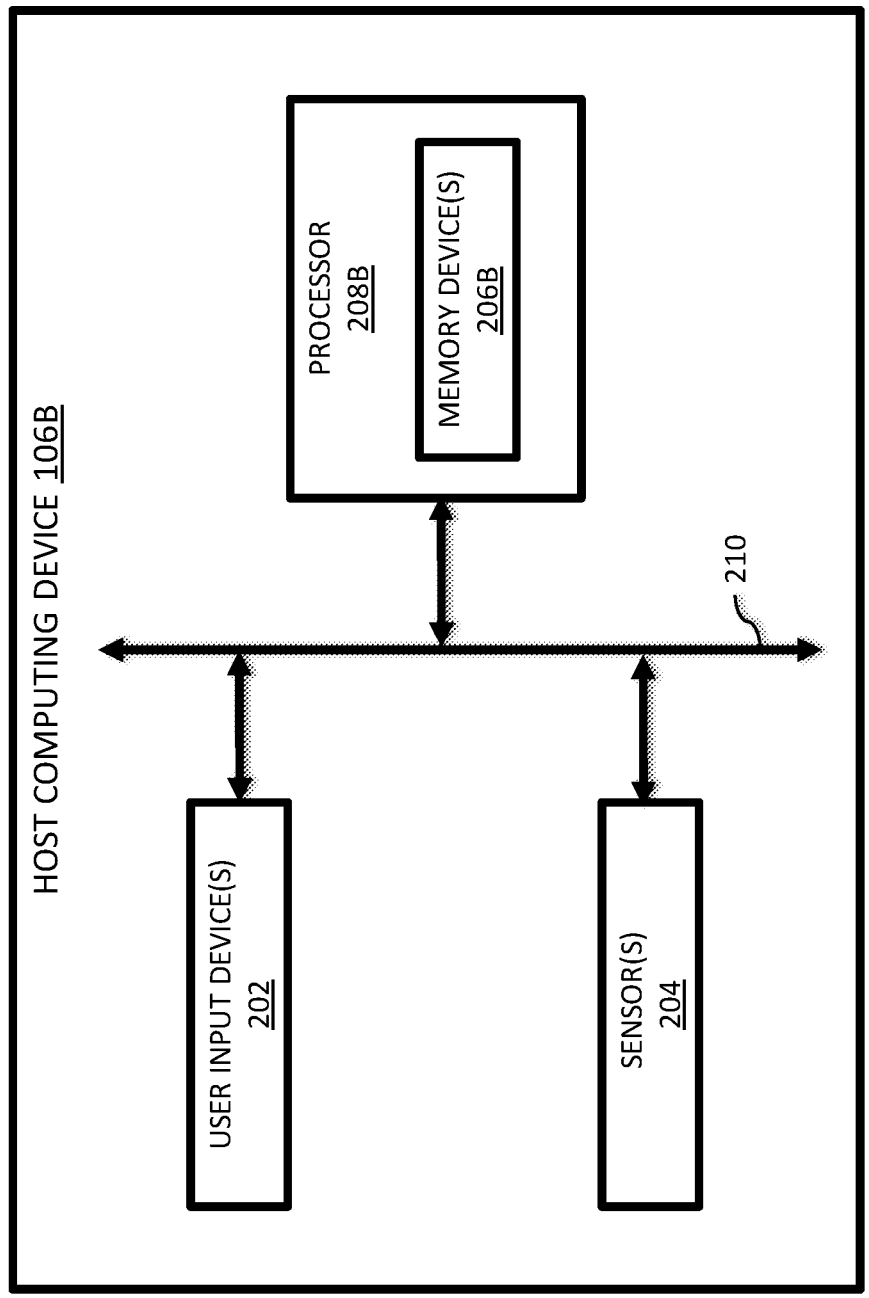
FIG. 2B is a block diagram of another embodiment of a host computing device included in the systems of FIGS. 1A and 1B.

Referring to FIG. 2B, FIG. 2B is a schematic block diagram of another embodiment of a host computing device 106B. A host computing device 106B may include and/or form a computing device/system (e.g., a laptop computer, a personal digital assistant (PDA), a tablet computer, a smart phone, a cellular telephone, a smart television, a wearable device, an Internet of Things (IoT) device, a game console, a vehicle on-board computer, a streaming device, a smart device, and a digital assistant, etc., among other computing devices and/or information handling devices that are possible and contemplated herein). The host computing device 106B includes a set of one or more user input devices 202 and a set of one or more sensor devices 204 similar to the host computing device 106A discussed with reference to FIG. 2A. At least in the embodiment illustrated in FIG. 2B, the host computing device 106B further includes, among other components, a processor 208B that includes a set of one or more memory devices 206B coupled to and in communication with the set of one or more user input devices 202 and the set of one or more sensor devices 204 via a bus 210 (e.g., a wired and/or wireless bus).

Figure 4:
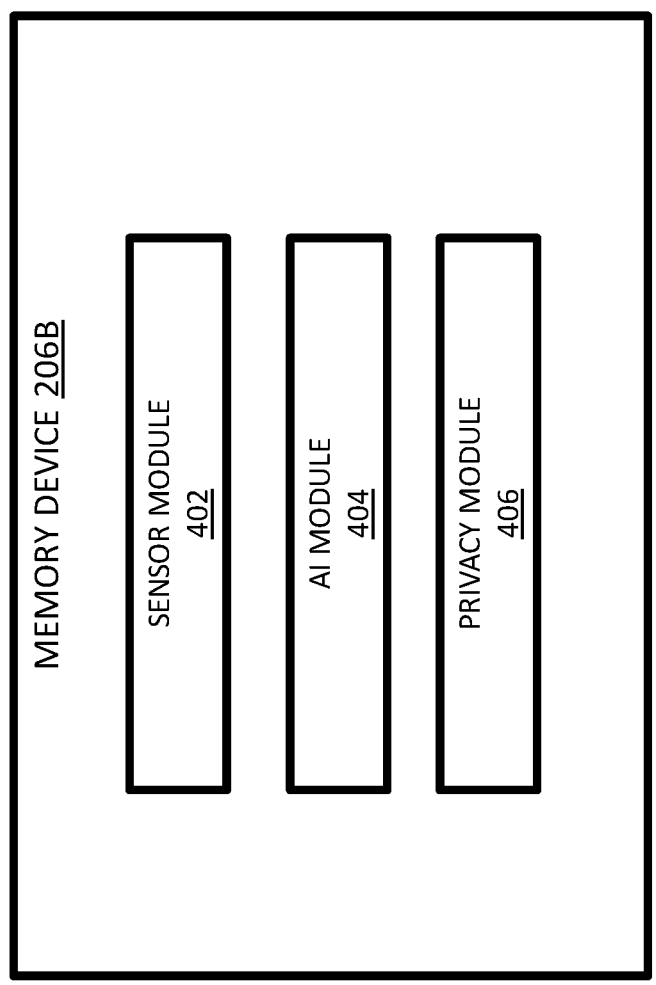
FIG. 4 is a block diagram of one embodiment of a memory device included in the host computing device of FIG. 2B.

With reference to FIG. 4, FIG. 4 is a schematic block diagram of another embodiment of a memory device 206B. At least in the illustrated embodiment, the memory device 206B includes, among other components, a sensor module 402, an AI module 404, and a privacy module 406 similar to the sensor module 302, the AI module 304, and the privacy module 306 discussed elsewhere herein with reference to the memory device(s) 206A (see, FIG. 3).

In various embodiments, the sensor module 402, the AI module 404, and/or the privacy module 406 includes computer-executable code and/or computer-useable code embedded in the memory device(s) 206B. Further, the embedded code including the privacy module 406 can provide a user an embedded opt-in permission for the sensor device(s) 204, the raw sensor data, the sensor data, and/or the AI service. In various embodiments, the embedded code forms at least a portion of a pre-boot code, an operating system code, a SMBIOS code, a device driver code, and/or an application code embedded in the memory device(s) 206B.

Referring again to FIG. 2B, a processor 208B may include any suitable non-volatile/persistent hardware and/or software configured to perform and/or facilitate performing functions and/or operations for facilitating embedded opt-in permission for an artificial intelligence service on a host 106B. In various embodiments, the processor 208B includes hardware and/or software for executing instructions in one or more modules and/or applications that can perform and/or facilitate performing functions and/or operations for facilitating embedded opt-in permission for an artificial intelligence service on the host 106B. The modules and/or applications executed by the processor 208B for facilitating embedded opt-in permission for an artificial intelligence service on a host 106B can be stored on and executed from a memory device 206B.

In some embodiments, the processor 208B is configured to transmit the data and/or results from the AI service to one or more of the external devices 104. In other embodiments, the processor 208B is configured to keep/maintain the data and/or results from the AI service on the host 106B and not transmit the data and/or results from the AI service to any of the external devices 104.

With reference to FIG. 2C, FIG. 2C is a schematic block diagram of yet another embodiment of a host computing device 106C. A host computing device 106C may include and/or form a computing device/system (e.g., a laptop computer, a personal digital assistant (PDA), a tablet computer, a smart phone, a cellular telephone, a smart television, a wearable device, an Internet of Things (IoT) device, a game console, a vehicle on-board computer, a streaming device, a smart device, and a digital assistant, etc., among other computing devices and/or information handling devices that are possible and contemplated herein). The host computing device 106C includes a set of one or more user input devices 202 and a set of one or more sensor devices 204 similar to the host computing device 106A discussed with reference to FIG. 2A. At least in the embodiment illustrated in FIG. 2C, the host computing device 106C further includes, among other components, a processor 208C coupled to and in communication with the set of one or more user input devices 202 and the set of one or more sensor devices 204 via a bus 210 (e.g., a wired and/or wireless bus).

Figure 5:
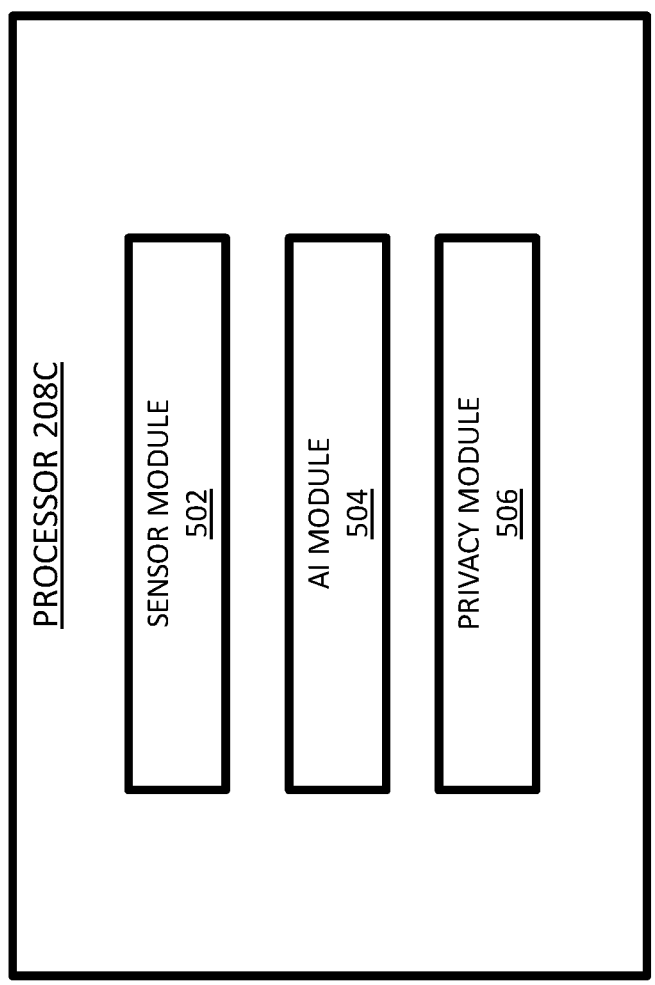
FIG. 5 is a block diagram of one embodiment of a processor included in the host computing device of FIG. 2C.

With reference to FIG. 5, FIG. 5 is a schematic block diagram of another embodiment of a processor 208C. At least in the illustrated embodiment, the processor 208C includes, among other components, a sensor module 502, an AI module 504, and a privacy module 506 similar to the sensor module 302, the AI module 304, and the privacy module 306 discussed elsewhere herein with reference to the memory device(s) 206A (see, FIG. 3).

In various embodiments, the sensor module 502, the AI module 504, and/or the privacy module 506 includes computer-executable code and/or computer-useable code embedded in the processor 208C. Further, the embedded code including the privacy module 506 can provide a user an embedded opt-in permission for the sensor device(s) 204, the raw sensor data, the sensor data, and/or the AI service. In various embodiments, the embedded code forms at least a portion of a pre-boot code, an operating system code, a SMBIOS code, a device driver code, and/or an application code embedded in the processor 208C.

Referring again to FIG. 2C, a processor 208C may include any suitable non-volatile/persistent hardware and/or software configured to perform and/or facilitate performing functions and/or operations for facilitating embedded opt-in permission for an artificial intelligence service on a host 106C. In various embodiments, the processor 208C includes hardware and/or software for executing instructions in one or more modules and/or applications that can perform and/or facilitate performing functions and/or operations for facilitating embedded opt-in permission for an artificial intelligence service on the host 106C. The modules and/or applications executed by the processor 208C for facilitating embedded opt-in permission for an artificial intelligence service on a host 106C can be stored on and executed from the processor 208C.

In some embodiments, the processor 208C is configured to transmit the data and/or results from the AI service to one or more of the external devices 104. In other embodiments, the processor 208C is configured to keep/maintain the data and/or results from the AI service on the host 106C and not transmit the data and/or results from the AI service to any of the external devices 104.

In operation, a user (and/or system administrator) of a host computing device 106 can select, set, and/or implement one of a plurality of access levels for obtaining raw sensor data, calculating sensor data, and/or gaining insight about the user in a privacy module 306, 406, 506. The access level can be selected, set, and/or implemented by the user and/or system administrator in the privacy module 306, 406, 506 based on any suitable criteria or criterion.

In some embodiment, the implemented access level is applied to one or more sensor devices 204 in detecting and/or generating raw sensor data. In other embodiments, the implemented access level is applied to a sensor module 302, 402, 502 in generating sensor data. In still other embodiments, the implemented access level is applied to an AI module 304, 404, 504 in performing an AI service. In further embodiments, the implemented access level is applied to two of the sensor device(s) 204 generating raw sensor data, the sensor module 302, 402, 502 in generating sensor data, and the AI module 304, 404, 504 in performing an AI service. In still further embodiments, the implemented access level is applied to each of the sensor device(s) 204 generating raw sensor data, the sensor module 302, 402, 502 in generating sensor data, and the AI module 304, 404, 504 in performing an AI service.

In a non-limiting example, a host computing device 106 for general and/or public use (e.g., a kiosk) may be configured by a system administrator to implement a fully restricted access level, a local use only access level, a prompted access level, an application-specific access level, and/or a service-specific access level. In another non-limiting example, a host computing device 106 for personal use (e.g., a personal computing device) may be configured by a user to implement an application-based access level, a quantity-based access level, a location-based access level, and/or a time-based access level.

After the access level is selected, implemented, and/or set, the sensor device(s) 204 can detect/sense one or more biometric properties/states of the user and generate corresponding raw sensor data. In certain embodiments, the generated raw sensor data can be based on and/or limited by the implemented access level in any manner, as discussed elsewhere herein. For example, an implemented access level may allow any and all raw sensor data. Other access levels may limit the raw sensor data to one or more subsets of raw sensor data (e.g., biometric traits, personal traits, and/or contextual traits, and/or one or more subsets within a particular subset, among other limits and/or types of limits that are possible and contemplated herein).

Depending on the implemented access level, all of the raw sensor data, a subset of the raw sensor data, or a limited subset of the raw sensor data is transmitted (in real-time or not in real-time) to and received by a sensor module 302, 402, 502. The sensor module 302, 402, 502 generates sensor data corresponding to the raw sensor data for the user, which can be based on and/or limited by the raw sensor data actually received by the sensor module 302, 402, 502. That is, the generated sensor data can be indirectly limited, limited in essence by, or in effect limited by the implemented access level as it is applied to the raw sensor data.

In certain embodiments, the generated sensor data can be based on and/or limited by the implemented access level in any manner, as discussed elsewhere herein. For example, an implemented access level may allow any and all sensor data. Other access levels may limit the sensor data to one or more subsets of sensor data (e.g., biometric traits, personal traits, and/or contextual traits, and/or one or more subsets within a particular subset, among other limits and/or types of limits that are possible and contemplated herein) even though the implemented access level may not have limited the raw sensor data received by the sensor module 302, 402, 502 and/or the raw sensor data received by the sensor module 302, 402, 502 included more raw sensor data than utilized in generating the sensor data.

Again, depending on the implemented access level, all of the sensor data, a subset of the sensor data, or a limited subset of the sensor data is transmitted (in real-time or not in real-time) to and received by an AI module 304, 404, 504. The AI module 304, 404, 504 performs (in real-time or not in real-time) one or more AI services using the sensor data, which can be based on and/or limited by the sensor data actually received by the AI module 304, 404, 504. That is, the AI service(s) can be indirectly limited, limited in essence by, or in effect limited by the implemented access level as it is applied to the sensor data.

In certain embodiments, the AI service(s) can be based on and/or limited by the implemented access level in any manner, as discussed elsewhere herein. For example, an implemented access level may allow performance of any and all AI services. Other access levels may limit the AI service to one or more subsets of the AI service even though the implemented access level may not have limited the sensor data received by the AI module 304, 404, 504 and/or the sensor data received by the AI module 304, 404, 504 included more sensor data than utilized in performing the AI service(s).

One or more AI collection indicators may be presented to the user during, before, and/or after any of the operations performed by the sensor device(s) 204, the sensor module 302, 402, 502, and/or the AI module 304, 404, 504 discussed above. In various embodiments, the AI collection indicator may be a consistent indicator or alert and/or a periodic indicator or alert. That is, the indicator(s)/alert(s) may be turned ON in response to the sensor device(s) 204 beginning to sense the biometric property/properties of the user and remain continuously ON until the AI module has completed performing the AI service(s).

In additional or alternative embodiments, the indicator(s)/alert(s) may be temporarily turned ON and then turned OFF in response to the sensor device(s) 204 beginning to sense the biometric property/properties of the user, temporarily turned ON and then turned OFF in response to the sensor module beginning to generate the sensor data, and/or temporarily turned ON and then turned OFF in response to the AI module beginning to perform the AI service(s).

In various embodiments, the sensing device(s) 204, the sensor module 302, 402, 502, the AI module 304, 404, 504, and/or the privacy module 306, 406, 506 can automatedly and/or automatically perform their respective operations discussed herein. That is, the sensing device(s) 204, the sensor module 302, 402, 502, the AI module 304, 404, 504, and/or the privacy module 306, 406, 506 can independently perform at least a portion of their respective operations without human intervention, interaction, and/or assistance.

Figure 6:
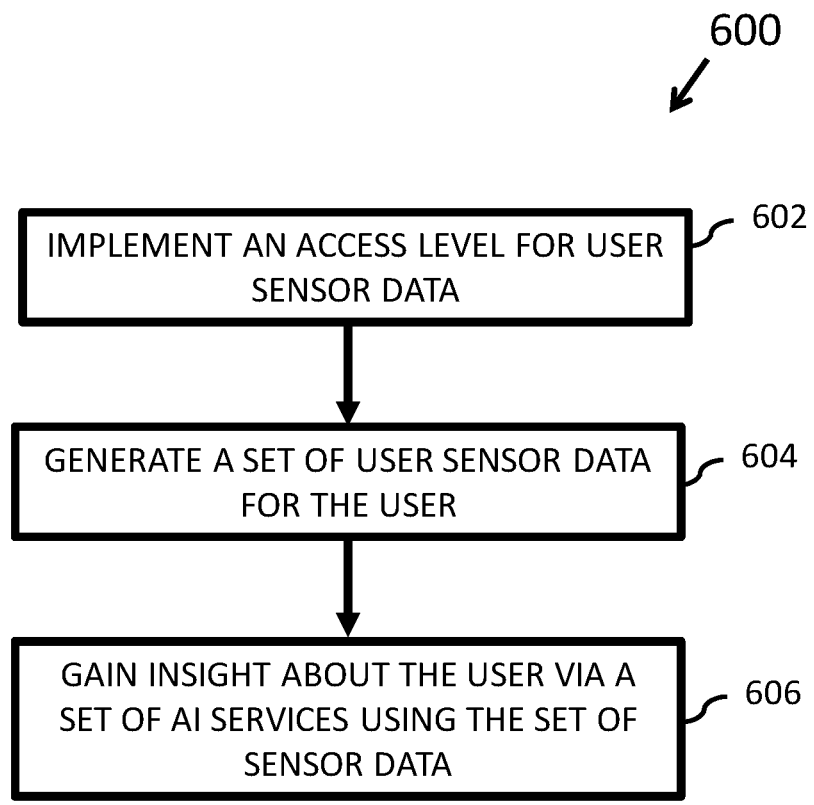
FIG. 6 is a schematic flow chart diagram illustrating one embodiment of a method for embedding an opt-in permission for an AI service.

With reference to FIG. 6, FIG. 6 is a schematic flow chart diagram illustrating one embodiment of a method 600 for providing an embedded opt-in permission for an artificial intelligence. At least in the illustrated embodiment, the method 600 can begin by a processor (e.g., processor 208A, 208B, or 208C (also simply referred to individually or collectively as, processor(s) 208)) implementing an access level of a plurality of access levels for user sensor data (block 602). The implemented access level can be any one of the access levels discussed elsewhere herein.

Based on the implemented access level, the processor 208 generates, from a set of raw sensor data received from a set of sensor devices 204, a set of sensor data for a user (block 604). Further based on the implemented access level, processor 208 gains insight about the user of via an AI service utilizing the set of sensor data (block 606). In certain embodiments, gaining insight about the user of via an AI service utilizing the set of sensor data including performing a set of one or more AI services utilizing the set of sensor data to gain one or more insights about the user.

The set of sensor data for the user may include any of the sensor data discussed elsewhere herein. Similarly, insight gained about the user may include any of the insights (e.g., physical health, mental health, and/or personal care) discussed elsewhere herein. In various embodiments, implementing the access level provides to the user an embedded opt-in permission for the AI service.

Figure 7:
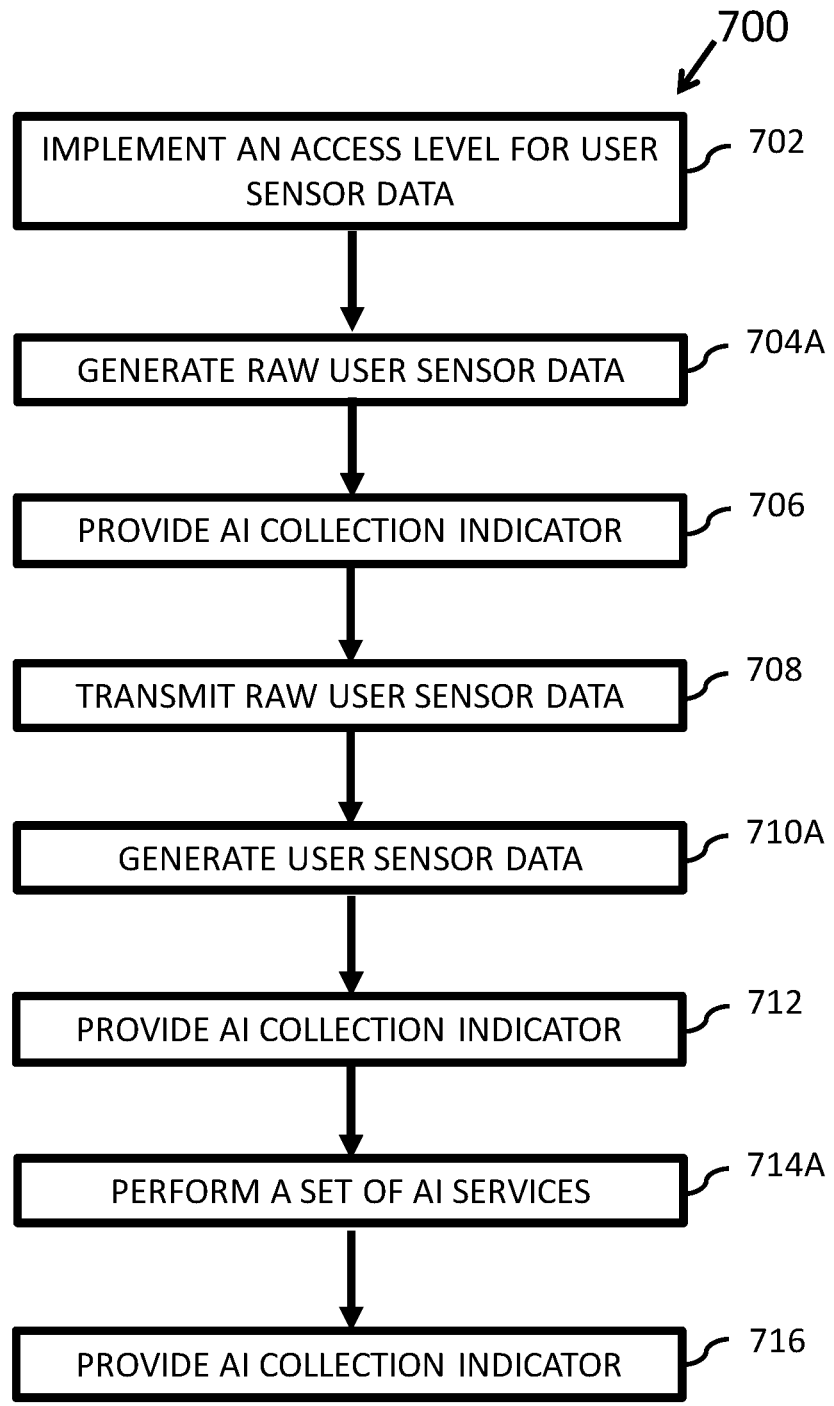
FIG. 7 is a schematic flow chart diagram illustrating another embodiment of a method for embedding an opt-in permission for an AI service.

With reference to FIG. 7, FIG. 7 is a schematic flow chart diagram illustrating another embodiment of a method 700 for providing an embedded opt-in permission for an artificial intelligence. At least in the illustrated embodiment, the method 700 can begin by a processor 208 implementing an access level of a plurality of access levels for user sensor data (block 702). The implemented access level can be any one of the access levels discussed elsewhere herein. In various embodiments, implementing the access level provides to the user an embedded opt-in permission for performing one or more AI services for the user.

A set of sensor devices 204 generates a set of raw sensor data for the user (block 704B) and the processor 208 can provide an AI collection indictor to the user before and/or while the raw sensor data is being generated by the sensor device(s) 204 (block 706). The set of raw sensor data for the user may include any of the raw sensor data discussed elsewhere herein. In some embodiments, providing the AI collection indictor to the user in block 706 is optional.

The sensor device(s) 204 transmit the raw sensor data to the processor 208 (block 708) and the processor 208 generates a set of sensor data for the user based on and corresponding to the set of raw sensor data (block 710A). The set of sensor data for the user may include any of the sensor data discussed elsewhere herein.

The processor 208 can provide an AI collection indictor to the user before and/or while the sensor data is being generated by the processor 208 (block 712). In some embodiments, providing the AI collection indictor to the user in block 712 is optional.

The processor 208 perform a set of AI services using the generated sensor data to gain one or more insights about the user (block 714A). The insight gained about the user may include any of the insights (e.g., physical health, mental health, and/or personal care) discussed elsewhere herein.

The processor 208 can provide an AI collection indictor to the user before and/or while the AI service(s) is/are being performed by the processor 208 (block 716). In some embodiments, providing the AI collection indictor to the user in block 716 is optional.

With reference to FIG. 8, FIG. 8 is a schematic flow chart diagram illustrating another embodiment of block 704A included in the method 700. At least in the illustrated embodiment, generating the set of the raw sensor data for the user includes generating a subset of the set of raw sensor data based on the implemented access level (block 704B).

In various embodiments, the subset of raw sensor data is the set of raw sensor data limited by the implemented access level. For example, the subset of raw sensor data can be raw sensor data limited by the location of the host 106, a user prompt and acceptance, a specific application, a specific service, a type of application, a quantity of operations, and/or a time of operations, among other limits and/or subsets of raw sensor data that are possible and contemplated herein, as discussed above. Further, the subset of raw sensor data for the user may include any suitable subset of the raw sensor data generated and/or capable of being generated by the sensor device(s) 204 discussed elsewhere herein.

Referring to FIG. 9, FIG. 9 is a schematic flow chart diagram illustrating another embodiment of block 710A included in the method 700. At least in the illustrated embodiment, generating the set of the sensor data for the user includes generating a subset of the set of sensor data based on the implemented access level (block 710B).

In various embodiments, the subset of sensor data is the set of sensor data limited by the implemented access level. In one non-limiting example, the subset of sensor data can be the set raw sensor data limited by the implemented access level (e.g., the subset of raw sensor data (see, e.g., block 704B in FIG. 8)). In other non-limiting examples, the subset of sensor data can be sensor data limited by the location of the host 106, a user prompt and acceptance, a specific application, a specific service, a type of application, a quantity of operations, and/or a time of operations, among other limits and/or subsets of raw sensor data that are possible and contemplated herein, as discussed above. Further, the subset of raw sensor data for the user may include any suitable subset of the raw sensor data generated and/or capable of being generated by the sensor device(s) 204 discussed elsewhere herein.

With reference to FIG. 10, FIG. 10 is a schematic flow chart diagram illustrating another embodiment of block 714A included in the method 700. At least in the illustrated embodiment, performing the set of the AI services for the user includes performing a subset of the set of AI services based on the implemented access level (block 714B).

In various embodiments, the subset of AI services is the set of AI services limited by the implemented access level. In some non-limiting examples, the subset of AI services can be the result of the set sensor data being limited by the implemented access level (e.g., the subset of sensor data (see, e.g., block 710B in FIG. 9)) and/or the set raw sensor data being limited by the implemented access level (e.g., the subset of raw sensor data (see, e.g., block 704B in FIG. 8)). In other non-limiting examples, the subset of sensor data can be sensor data limited by the location of the host 106, a user prompt and acceptance, a specific application, a specific service, a type of application, a quantity of operations, and/or a time of operations, among other limits and/or subsets of raw sensor data that are possible and contemplated herein, as discussed above. Further, the subset of raw sensor data for the user may include any suitable subset of the raw sensor data generated and/or capable of being generated by the sensor device(s) 204 discussed elsewhere herein.

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. An apparatus, comprising:
a processor; and
a memory configured to store embedded code executable by the processor to:
implement an access level of a plurality of access levels for a set of sensors generating user sensor data, and
based on the implemented access level for the set of sensors, perform a set of operations to:
generate, from a set of raw sensor data related to an active use of the apparatus and received from the set of sensors, a set of sensor data for a user of the apparatus corresponding to the implemented access level and related to the active use of the apparatus, wherein the user of the apparatus is unaware that the set of sensors are generating the set of raw sensor data related to the active use of the apparatus at a time when the set of raw sensor data is being generated by the set of sensors,
notify the user of the apparatus that at least one biometric property of the user of the apparatus is being collected by the set of sensors and is included in the set of raw sensor data related to the active use of the apparatus subsequent to the time when the set of raw sensor data is generated by the set of sensors, and
gain insight about the user of the apparatus via an artificial intelligence (AI) service utilizing the set of sensor data related to the active use of the apparatus corresponding to the implemented access level,
wherein implementing the access level provides to the user of the apparatus an embedded opt-in/opt-out permission for the AI service.

2. The apparatus of claim 1, wherein the embedded code comprises one of pre-boot code, operating system code, system management basic input/output system (SMBIOS) code, device driver code, and application code embedded in the memory.

3. The apparatus of claim 1, wherein the plurality of access levels comprises a low privacy level, a medium privacy level, and a high privacy level.

4. The apparatus of claim 1, wherein the plurality of access levels comprises an application-based access level, a quantity-based access level, a location-based access level, and a time-based access level.

5. The apparatus of claim 1, wherein the embedded code is configured to cause the processor to provide an AI collection indicator to the user in response to the processor performing the set of operations that generate the set of sensor data for the user of the apparatus and gain insight about the user of the apparatus.

6. The apparatus of claim 1, wherein:
the set of sensor data is generated in real-time; and
the insight about the user of the apparatus is gained in real-time.

7. The apparatus of claim 1, wherein:
the set of sensor data is stored in a library; and
the insight about the user of the apparatus is gained subsequent to the set of sensor data being stored in the library.

8. A method, comprising:
implementing, by a processor, an access level of a plurality of access levels for a set of sensors generating user sensor data; and
based on the implemented access level for the set of sensors:
generating, from a set of raw sensor data related to an active use of an apparatus and received from the set of sensors, a set of sensor data for a user of the apparatus corresponding to the implemented access level and related to the active use of the apparatus, wherein the user of the apparatus is unaware that the set of sensors are generating the set of raw sensor data related to the active use of the apparatus at a time when the set of raw sensor data is being generated by the set of sensors,
notify the user of the apparatus that at least one biometric property of the user of the apparatus is being collected by the set of sensors and is included in the set of raw sensor data related to the active use of the apparatus subsequent to the time when the set of raw sensor data is generated by the set of sensors, and
gaining insight about the user of the apparatus via an artificial intelligence (AI) service utilizing the set of sensor data related to the active use of the apparatus,
wherein implementing the access level provides to the user of the apparatus an embedded opt-in/opt-out permission for the AI service.

9. The method of claim 8, wherein the plurality of access levels comprises a low privacy level, a medium privacy level, and a high privacy level.

10. The method of claim 8, wherein the plurality of access levels comprises an application-based access level, a quantity-based access level, a location-based access level, and a time-based access level.

11. The method of claim 8, further comprising:
providing an AI collection indicator to the user in response to generating the set of sensor data for the user of the apparatus and gaining insight about the user of the apparatus.

12. The method of claim 8, wherein:
the set of sensor data is generated in real-time; and
the insight about the user of the apparatus is gained in real-time.

13. The method of claim 8, wherein:
the set of sensor data is stored in a library; and
the insight about the user of the apparatus is gained subsequent to the set of sensor data being stored in the library.

14. A computer program product comprising a computer-readable storage medium configured to store embedded code executable by a hardware processor, the embedded executable code comprising code to perform:
implementing an access level of a plurality of access levels for a set of sensors generating user sensor data; and
based on the implemented access level for the set of sensors:
generating, from a set of raw sensor data related to an active use of an apparatus and received from a set of sensors, a set of sensor data for a user of the apparatus corresponding to the implemented access level and related to the active use of the apparatus, wherein the user of the apparatus is unaware that the set of sensors are generating the set of raw sensor data related to the active use of the apparatus at a time when the set of raw sensor data is being generated by the set of sensors,
notifying the user of the apparatus that at least one biometric property of the user of the apparatus is being collected by the set of sensors and is included in the set of raw sensor data related to the active use of the apparatus subsequent to the time when the set of raw sensor data is generated by the set of sensors, and
gaining insight about the user of the apparatus via an artificial intelligence (AI) service utilizing the set of sensor data related to the active use of the apparatus corresponding to the implemented access level,
wherein implementing the access level provides to the user of the apparatus an embedded opt-in/opt-out permission for the AI service.

15. The computer program product of claim 14, wherein the embedded code comprises one of pre-boot code, operating system code, system management basic input/output system (SMBIOS) code, device driver code, and application code embedded in the memory.

16. The computer program product of claim 14, wherein the plurality of access levels comprises a low privacy level, a medium privacy level, and a high privacy level.

17. The computer program product of claim 14, wherein the plurality of access levels comprises an application-based access level, a quantity-based access level, a location-based access level, and a time-based access level.

18. The computer program product of claim 14, wherein the embedded code is configured to cause the processor to provide an AI collection indicator to the user in response to the processor generating the set of sensor data for the user of the apparatus and gaining insight about the user of the apparatus.

19. The computer program product of claim 14, wherein:
the set of sensor data is generated in real-time; and
the insight about the user of the apparatus is gained in real-time.

20. The computer program product of claim 14, wherein:
the set of sensor data is stored in a library; and
the insight about the user of the apparatus is gained subsequent to the set of sensor data being stored in the library.

* * * * *